D. J. SHEA.
SPRING WHEEL.
APPLICATION FILED NOV. 12, 1919.

1,348,590.

Patented Aug. 3, 1920.
2 SHEETS—SHEET 1.

Witness

Inventor
D. J. Shea.
By
Attorneys

D. J. SHEA.
SPRING WHEEL.
APPLICATION FILED NOV. 12, 1919.
1,348,590.
Patented Aug. 3, 1920.
2 SHEETS—SHEET 2.
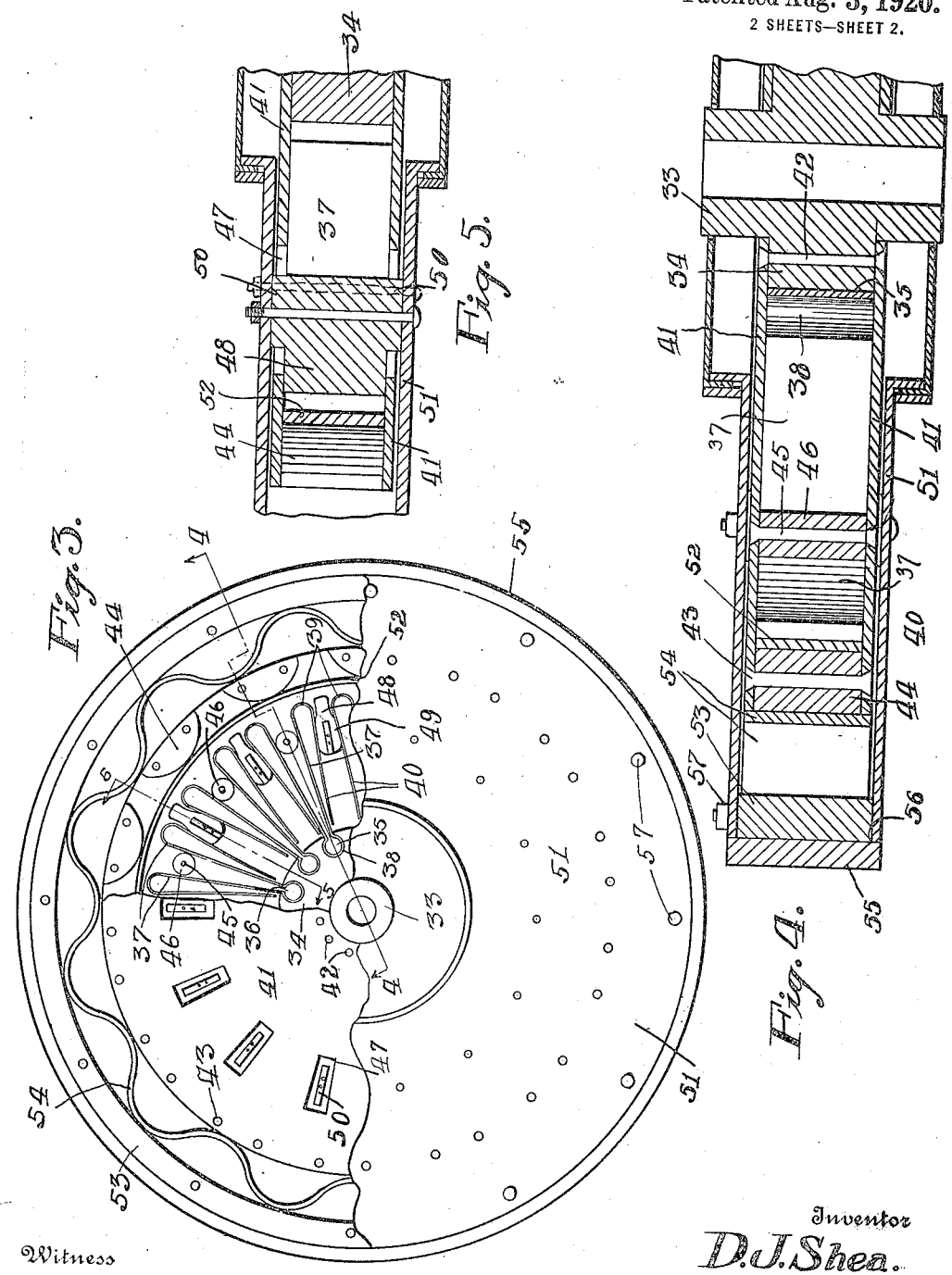

UNITED STATES PATENT OFFICE.

DAVID J. SHEA, OF MARIANNA, ARKANSAS.

SPRING-WHEEL.

1,348,590. Specification of Letters Patent. Patented Aug. 3, 1920.

Application filed November 12, 1919. Serial No. 337,538.

*To all whom it may concern:*

Be it known that I, DAVID J. SHEA, a citizen of the United States, residing at Marianna, in the county of Lee and State of Arkansas, have invented a new and useful Spring-Wheel, of which the following is a specification.

This invention relates to resilient or spring wheels adapted for use in connection with various kinds of wheeled vehicles, and more particularly automobiles, the object thereof being to provide a wheel which will not only absorb shocks and jars incident to the travel of the vehicle over uneven road surfaces, but which also obviate the objectionable feature of punctures and blow outs, so common to the ordinary pneumatic tires of rubber as at present commonly used in connection with automobiles.

With the above and other objects in view, as will appear as the description proceeds, the invention consists of certain novel combinations and arrangements of parts, particularly in the construction and assemblage of the wheel, as will be hereinafter more particularly pointed out and set forth in detail in the claims appended hereto.

In the accompanying drawings;

Fig. 3 is a side elevation partly broken away at two different planes, of another form of the invention, Fig. 4 is a sectional view taken on the line 4—4 of Fig. 3; and Fig. 5 is a sectional view taken on the line 5—5 of Fig. 3.

Figure 1:
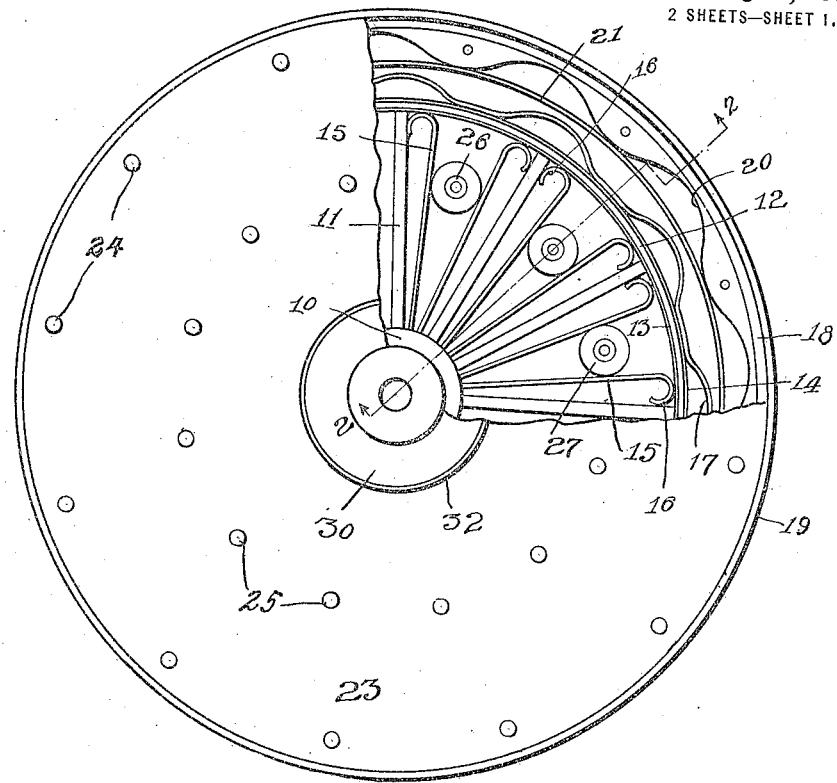
Figure 1 is a side elevation partly broken away, of one form of my improved spring wheel.
Figure 2:
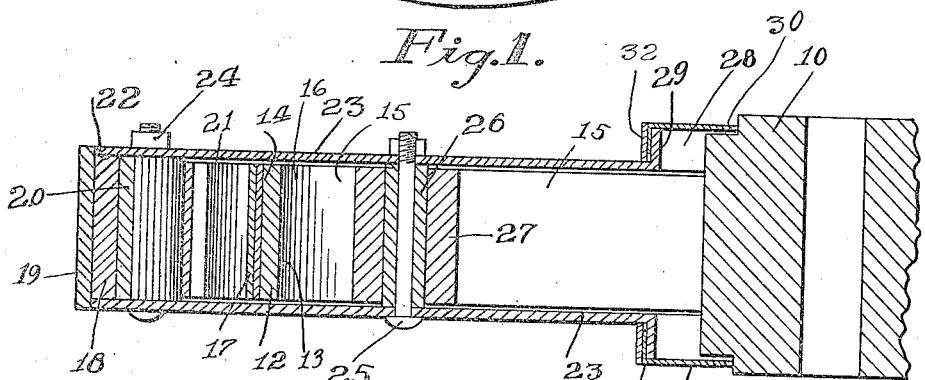
Fig. 2 is a sectional view taken on the line 2—2 of Fig. 1.

Referring to the drawings in detail, in which like reference characters designate similar parts throughout the several views, and in the form of the invention shown in Figs. 1 and 2 of the drawings, the wheel may be said or described as consisting of inner and outer sections or elements, the inner elements consisting of a hub 10 from which radiate a series of flat spokes 11 disposed edgewise across the wheel and connected at their outer ends to an inner rim 12 having an inner cushioning band 13 and an outer metallic rim band 14, said parts being suitably secured together rigidly to prevent displacement thereof edgewise or circumferentially.

Also extending from the hub are a series of pairs of spring spokes 15, which are disposed in outwardly diverging relation at either side of the spokes, being fitted at their inner ends in recesses extending radially of the hub, in the same manner as the spokes 11, or otherwise rigidly connected thereto, and having their outer ends bent or curved toward each other at adjacent spokes and against the opposed faces of the spokes as shown at 16. Also mounted on the rim 12 outwardly of the band 13, is a corrugated band 17, preferably of resilient metal and having the undulations thereof alternating in contact with the band 13 and secured rigidly thereto, while the intermediate portions are bowed or convexed outwardly, to provide radial cushions to be hereinafter more fully explained.

The outer element consists of an outer rim 18 provided with a tread or tire 19 and corrugated on the inner face thereof as shown at 20, suitable blocks or a band being provided for this purpose, so as to oppose the corrugated band 17, while positioned therebetween is an annular band 21, also of resilient metal. The tire 19 is wider than the rim 18 and the corrugated portion thereof, thus providing an annular seat or ledge 22, against which the outer or peripheral edges of opposed side plates 23 are secured flush with the edges of the tire, as shown at 24, bolts or the like being employed for this purpose and extending transversely through the plates and corrugated inwardly extending projections of the rim 18.

The plates are also connected intermediately between the hub and the rim or rim fastening means 24, as shown at 25, the connections consisting of bolts extending transversely of the wheel and extending through spacing sleeves 26 on which are rotatably mounted rollers 27 disposed in contact with the opposed spring spokes 15 which are movable with the inner element relative to the outer element and the rollers, with the spokes 15 in contact therewith. These rollers are also alternately arranged with respect to the spokes 11, and spaced intermediately of the hub and the inner rim, but preferably nearer to the latter, as shown.

The plates are thus held in fixed spaced relation and in contact with the opposed edges of the bands, rims, and so forth, above described, and at their inner portions said plates are provided with openings 28 and outwardly projecting flanges 29, extending approximately to the outer ends or opposite faces of the hub and adapted to loosely receive a covering of flexible material or fabric, preferably waterproof, such as canvas or the like, as shown at 30. This covering is retained in position at each side of the wheel and hub by engagement over the edges of the flanges 29, as shown at 31, sleeves 32 being engaged thereover to retain the coverings in position. By this means, the hub and parts associated therewith and constituting the inner section or element as aforesaid may have movement relative to the plates and parts associated therewith constituting the outer section or element, the bands 17 and 21, and the springs 15 allowing the necessary resiliency, and the rollers 27 moving inwardly and outwardly radially and circumferentially of the wheel, against the springs 15 and bowing or bending the latter intermediately by reason of the resiliency thereof and bowed or curved extremities or contacting portions thereof, so as to take up shocks and vibrations and reduce the strains on the working parts of the automobile or vehicle to a minimum. That is, as the wheel rotates under a load, one of the elements will move relative to the other element or section, the outer element moving first when the tire strikes an obstruction or depression and the inner element moving to absorb shock to the body of the vehicle. When the outer element moves downwardly or the inner element moves upwardly, the rollers 27 will operate between the springs 15, so that the rollers of the upper portion of the wheel will tend to spread the springs where they are closest together, and gradually decrease their pressure against the upper springs 15 as the sides or horizontal springs are approached when the springs 15 will be engaged or bent at the bottom, while said rollers will move into the open portions of the springs and away from the same at the bottom, the tension on the same being decreased from the sides or horizontal springs toward the bottom on the lower portion of the wheel. When the outer element moves upwardly or the inner element moves downwardly, the reverse action takes place. That is, the lower springs will be sustaining the load while the upper springs will be released.

In the form of the invention shown in Figs. 3, 4 and 5 of the drawings, the hub is designated at 33 and is provided with a central annular projection 34 formed around its periphery with a series of equidistantly spaced transversely extending openings 35 having restricted neck or throat portions, or slots 36 established communicating with the exterior thereof. These openings 35 are of circular formation in cross-section and are adapted to receive therein, spring spokes 37, which are formed of single sections of sheet metal bent intermediately of their ends to form circular bowed portions 38, outwardly diverging which are engaged detachably in the openings 35 and which have the branching arms or sides thereof extending through the slots 36 and radially outwardly. The free ends of the arms or sides of the spring spokes are further bent outwardly in opposite directions as shown at 39 and then inwardly as shown at 40, the free ends thereof terminating in spaced relation to the periphery of the hub, as is clearly shown in Fig. 3 of the drawings.

Disposed at opposite sides of the hub are plates 41, preferably of metal as are the plates 23 heretofore described, said plates 41 being secured in position as shown at 42 rigidly to the hub at the opposed faces thereof and connected at or near their outer or peripheral edges as shown at 43 by transverse fastening means extending through corrugated blocks or spacers 44 having convex inner faces as are the convex portions of the rim or corrugations 20 in the form of the invention shown in Figs. 1 and 2 of the drawings.

The plates 44 are further connected by means of bolts, rivets or the like 45, like the connections 43, and mounted to rotate on said connections 45 are rollers or sleeves 46 which operate between the main radial portions of the spring spokes 37 as the latter move inwardly and outwardly relative thereto, during the rotation of the wheel in use. This action results in the compression or bending and straightening of the springs, as in the form of the invention first described.

The plates 43 are further provided with opposed radial slots 47 between which are disposed spoke-like members or spacing blocks 48 radially extended and provided with opposite projections 49 engaging the free or outer portions of the spring spokes 37, so that the latter are movable between the rollers and the blocks as the wheel rotates in use under a load. These spokes or blocks 48 are also provided with longitudinal projections 50 at opposite sides thereof slidably engaging the slots 47 and constituting means for spacing the plates 43 from outer plates 51, to permit free movement thereof.

Between the spacers or blocks 44 and the spokes or blocks 48, is disposed a resilient band 52, which serves as a resilient connection between the parts, to take up shocks, vibrations and strains, and serve as a resilient impact to the load. There is also provided an outer rim 53, between which and the blocks or spacers 44 is disposed a corrugated or undulated band 54 or the like, to further assist in taking up shocks and vibrations between the inner and outer elements or sections of the wheel, as heretofore specified. The rim 53 is provided with a tire or tread 55 of metal or other suitable material, the rim being inset from the opposed edges of the tire so as to provide seats or recesses 56 for the outer edges or portions of the outer plates 51, which are rigidly secured thereto by bolts or the like as shown at 57, such fastening means extending transversely through the rim as shown. The outer plates are also provided with the coverings and same attaching means 28, 29 and 30, as already described in connection with the first form of the invention, and therefore further description thereof is deemed unnecessary, as the construction thereof is the same. In this construction, the operation is substantially the same as described in connection with the first form, except that the blocks at 48 move with the outer element, toward and away from the springs 37 at the portions 40 thereof, so that said springs are bowed under pressure or disengaged or relieved, while the rollers 46 operate between the springs 37 in the same manner as the rollers 27 operate between the springs 15, except that the action between the rollers 46 and the springs 37, is dependent upon the movements of the blocks 48 as the inner and outer elements of the wheel move relatively.

It will thus be seen that the wheel construction is not only simple but the working parts are thoroughly protected in use, and therefore, in addition to efficiently taking up shocks and jars incident to vibrations and travel over uneven road surfaces, entrance of dirt and other foreign matter into the interior of the wheel will be effectively prevented. In practice, the band 54 shown in Fig. 3, is omitted entirely under ordinary loads, the springs 37 coacting with the rollers 46 and the blocks 48, in conjunction with the band 52 and the spacers or blocks 44, serving to sustain the load. It is also to be understood that the distance between the blocks 44 and the rim 53 may be varied as desired, in the construction of the wheel.

Having thus described my invention, what I claim is:

1. In a spring wheel, a hub, spring spokes extending from the hub radially and having inturned outer ends, spacing members between the main portions of the spring spokes and including rollers mounted to turn therebetween, spacing means between the inturned portions of the spokes, an inner rim, an outer rim, corrugated members between said rims, resilient means therebetween and including resilient bands, a tire on the outer rim, a plurality of plates at the sides of the wheel, and means for connecting said plates against lateral displacement, certain thereof serving as mountings for the rollers.

2. A spring wheel comprising a flanged hub, radiating spring metal spokes carried by the hub and having their outer ends bent alternately in opposite directions inwardly, opposed plates encircling the hub and suitably connected in fixed parallel relation to house said spokes, spacing members between adjacent spokes and including rollers, an annular band outwardly of the spokes, corrugated projections engaging said band, a rim outwardly of said projections and adapted to carry a tire, and flexible coverings carried by the plates and fitting the hub outwardly of the flanged portion.

In testimony that I claim the foregoing as my own, I have hereto affixed my signature in the presence of two witnesses.

DAVID J. SHEA.

Witnesses:
 A. S. RODGERS,
 BEN B. BONNER.